(12) United States Patent
Janjua

(10) Patent No.: US 8,877,065 B2
(45) Date of Patent: Nov. 4, 2014

(54) SKIM TANK CONFIGURATIONS AND METHODS

(75) Inventor: Rafique Janjua, Sugarland, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1194 days.

(21) Appl. No.: 12/595,177

(22) PCT Filed: Apr. 30, 2008

(86) PCT No.: PCT/US2008/005573
§ 371 (c)(1),
(2), (4) Date: Oct. 20, 2009

(87) PCT Pub. No.: WO2008/137006
PCT Pub. Date: Mar. 13, 2008

(65) Prior Publication Data
US 2010/0163498 A1    Jul. 1, 2010

Related U.S. Application Data

(60) Provisional application No. 60/914,981, filed on Apr. 30, 2007.

(51) Int. Cl.
| | | |
|---|---|---|
| C02F 1/24 | (2006.01) | |
| B03D 1/14 | (2006.01) | |
| B01F 5/10 | (2006.01) | |
| B03D 1/24 | (2006.01) | |
| B01D 21/00 | (2006.01) | |
| B01D 21/02 | (2006.01) | |
| B01D 21/24 | (2006.01) | |
| B01D 21/28 | (2006.01) | |
| B01D 21/34 | (2006.01) | |
| B01F 15/00 | (2006.01) | |
| B01F 3/00 | (2006.01) | |

(52) U.S. Cl.
CPC ... *B01F 5/10* (2013.01); *C02F 1/24* (2013.01); *B03D 1/247* (2013.01); *B03D 1/1493* (2013.01); *B01D 21/0042* (2013.01); *B01D 21/0087* (2013.01); *B01D 21/10* (2013.01); *B01D 21/2433* (2013.01); *B01D 21/2488* (2013.01); *B01D 21/286* (2013.01); *B01D 21/34* (2013.01); *B01F 15/00915* (2013.01); *B01F 2003/0028* (2013.01)
USPC .......................................... 210/703; 210/221.2

(58) Field of Classification Search
CPC .......... C02F 1/24; B03D 1/1493; B03D 1/247
USPC ............................................... 210/703, 221.2
See application file for complete search history.

(56) References Cited

U.S. PATENT DOCUMENTS 3,314,880 A  *  4/1967  Arne ............................. 210/705
3,506,125 A  *  4/1970  Oldfather et al. ............. 210/776
(Continued)

FOREIGN PATENT DOCUMENTS

| DE | 233827 | | 3/1986 |
|---|---|---|---|
| FR | 2371968 | * | 7/1978 |

(Continued)

*Primary Examiner* — Thomas M Lithgow
(74) *Attorney, Agent, or Firm* — Fish & Tsang, LLP

(57) ABSTRACT

A skim tank includes a flow-control structure that forces a solid-depleted phase of a mixed-phase feed into a toroidal motion within the container to thereby provide an up-flow movement within the structure. Most preferably, at least a portion of the solid-depleted phase is recirculated to further increase up-flow movement within the structure.

16 Claims, 2 Drawing Sheets

(56) References Cited

U.S. PATENT DOCUMENTS

| | | |
|---|---|---|
| 3,623,608 A | 11/1971 | Waterman |
| 3,932,282 A * | 1/1976 | Ettelt ..................... 210/195.1 |
| 3,951,806 A | 4/1976 | Young |
| 4,142,967 A | 3/1979 | Fremont |
| 4,294,697 A | 10/1981 | Sawa et al. |
| 4,399,028 A | 8/1983 | Kile et al. |
| 4,883,602 A | 11/1989 | Anderson |
| 4,902,429 A * | 2/1990 | Carpenter et al. ............ 210/704 |
| 5,156,745 A | 10/1992 | Cairo, Jr. et al. |
| 5,431,286 A | 7/1995 | Xu et al. |
| 5,472,094 A | 12/1995 | Szymocha et al. |
| 5,897,772 A | 4/1999 | Chiang |
| 6,896,816 B2 * | 5/2005 | Everton ..................... 210/705 |
| 2008/0230485 A1 * | 9/2008 | Shechter et al. ............. 210/750 |

FOREIGN PATENT DOCUMENTS

| | | |
|---|---|---|
| GB | 2035285 | 6/1980 |
| JP | 02245286 | 10/1990 |
| JP | 05-212210 A * | 8/1993 |
| SU | 1270945 | 2/1988 |
| WO | 00/15343 | 3/2000 |
| WO | 2004082842 | 9/2004 |

* cited by examiner

SKIM TANK CONFIGURATIONS AND METHODS

This application claims priority to our copending U.S. provisional application with the Ser. No. 60/914,981, was filed Apr. 30, 2007, and which is incorporated by reference herein.

FIELD OF THE INVENTION

The field of the invention is devices and methods of solid/liquid separation, especially as it relates to dynamic on-line separation of low-density solids from liquids in a tank.

BACKGROUND OF THE INVENTION

Removal of solid phases, and especially removal of scum and flocculated materials from aqueous fluids has been practiced in numerous industries for several decades. However, despite the technically relatively simple task, numerous difficulties remain.

For example, centrifugal separation provides a relatively effective and fast method of separating a solid phase from a liquid, however, has limited use where the particle size and/or concentration are relatively low. Moreover, and especially where the volume of treated fluid is relatively large, centrifugal separation often becomes impractical due to the required rotor size and energy consumption. Alternatively, lamella-type separators can be employed that obviate the need for moving parts. Such separators are often relatively energy efficient and typically allow for a good separation efficacy. However, centrifugation and lamella-type separation are generally only effective for solid materials that have a higher density than the solvent (typically water).

Where the solid material has a lower density than the solvent (e.g., sticky & non sticky-oil sludge, scum, and/or coagulated-flocculated materials) solids can often easily removed without significant mechanical intervention in settling or holding tanks to allow density separation. However, where the effluent volume is relatively large and/or the density difference is relatively small, required volumes for the settling or holding tanks and time for separation would be impractical under most circumstances. To speed up separation, mechanical measures can be taken. For example, many of the currently operating separators employ dissolved air flotation or impart centrifugal momentum into the mixed-phase feed. While such approaches are conceptually relatively simple, currently known separators often require moving parts and significant amounts of energy. Moreover, moving parts require maintenance and therefore add further cost and/or downtime. To overcome at least some of these difficulties, gas liquid coalescers (e.g., U.S. Pat. No. 5,156,745) using microscopic gas bubbles may be employed in which the device is configured to reduce inter cell or vessel chamber turbulence to reduce or even eliminate remixing of the separated material with the fluid. While such device advantageously reduces at least in some cases energy consumption and improves separation efficiency, several disadvantages still remain. For example, as the solution moves through the gas liquid coalescer in a single pass, high efficiency must be maintained at all times to produce a consistently clarified product.

Therefore, while numerous methods of mixed-phase separation are known in the art, all or almost all of them suffer from one or more disadvantages. Consequently, there is still a need to provide improved configurations and methods to improve mixed-phase separation, especially where colloidal clay/silica etc. are emulsified in a liquid.

SUMMARY OF THE INVENTION

The present invention is directed to configurations and methods for separation of a mixed-phase feed into a solid-enriched phase and a solid-depleted phase where a flow-control structure within a container assists in generating an enhanced toroidal flow to increase and/or facilitate separation, and where an overflow element is configured to receive the solid-enriched phase. Most preferably, at least some of the solid-depleted phase is returned to and combined with the mixed-phase feed to so increase up-flow motion of the feed. In especially preferred aspects, the skim tank is fluidly coupled to a desalter mud wash unit such that provides the effluent from the desalter mud wash unit as the mixed-phase feed.

In one especially preferred aspect of the inventive subject matter, a skim tank includes a container that houses a flow-control structure within the container, wherein the flow-control structure is configured to force flow of a first portion of a solid-depleted phase of the mixed-phase feed into a toroidal motion within the container and around the flow control structure. The container is also configured to allow withdrawal of a second portion of the solid-depleted phase, and a fluid conduit is coupled to the container and configured to allow recirculation of at least some of the second portion of the solid-depleted phase back into the flow-control structure. In further preferred devices, an overflow element (e.g., conical shape) is disposed in the container and configured to allow removal of a solid-enriched phase separated from the mixed-phase.

Most typically, contemplated skim tanks further include a mixed-phase feed conduit that is configured to release the mixed-phase feed from the conduit into an inner volume of the flow-control structure, wherein in at least some embodiments the lower opening of the flow-control structure is suspended above the inner bottom surface of the container. While not limiting to the inventive subject matter, it is preferred that the flow-control structure has a cylindrical shape and may further comprise one or more flow directing element to impart vortex motion and/or assist in up-flow of the feed. Alternatively, or additionally, a gas source (e.g., compressed air or other gas) may be coupled to the container and configured to provide gas to the mixed-phase feed.

Where desired, the flow-control structure may be configured to impart an up-flow motion into the mixed-phase feed and the overflow element may be configured to redirect the up-flow motion into a side-flow motion. Further contemplated skim tanks may include a second conduit that delivers a fraction of the solid-depleted phase as a rinse fluid via a spray nozzle or other arrangement to an inner surface of the overflow element, and/or an additional conduit to use the solid-depleted phase as a hydro skimmer to enhance sludge transfer to the overflow element. With respect to volume and/or operational control, it is contemplated that the skim tank may also include one or more control elements that allow raising of the liquid level in the container such that at least some of the solid-enriched phase is forced into the overflow element.

Therefore, in another aspect of the inventive subject matter, a method of separating a mixed-phase feed into a solid-enriched phase and a solid-depleted phase will include a step of introducing the mixed-phase feed, optionally with a gas, into a container wherein a flow-control structure is used within the container to force a first portion of the liquid phase into a toroidal motion around the flow control structure. In another step, a second portion of the liquid phase is recirculated back to the flow control structure, and an overflow element is positioned above the flow control structure to remove the solid phase that is separated from the mixed-phase feed.

Most preferably, the flow control structure has a cylindrical shape and is centrally disposed within a tank, and a mixed-phase feed conduit releases the mixed-phase feed from the mixed-phase feed conduit into an inner volume of the flow-control structure. In such methods, it is further preferred that the lower opening of the flow-control structure is suspended above the inner bottom surface of the container. Therefore, and especially where the overflow element has a conical shape, the flow-control structure imparts an up-flow motion into the mixed-phase feed and the overflow element redirects the up-flow motion into a side-flow motion to so further drive the toroidal motion.

Various objects, features, aspects and advantages of the present invention will become more apparent from the following detailed description of preferred embodiments of the invention, along with the accompanying drawing.

DETAILED DESCRIPTION

Figure 1:
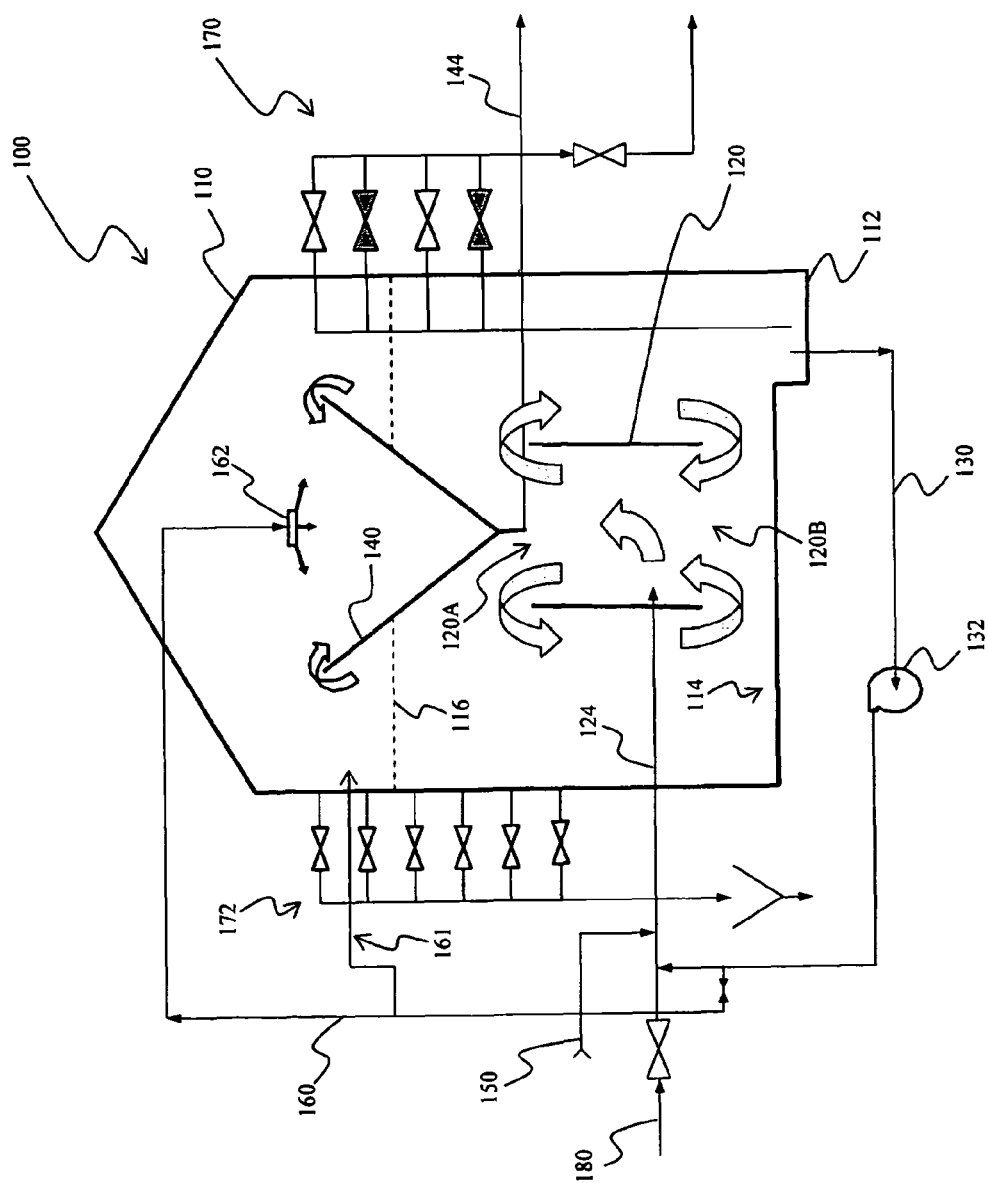
FIGS. 1 and 2 are an exemplary schematic of a skim tank according to the inventive subject matter.
Figure 2:
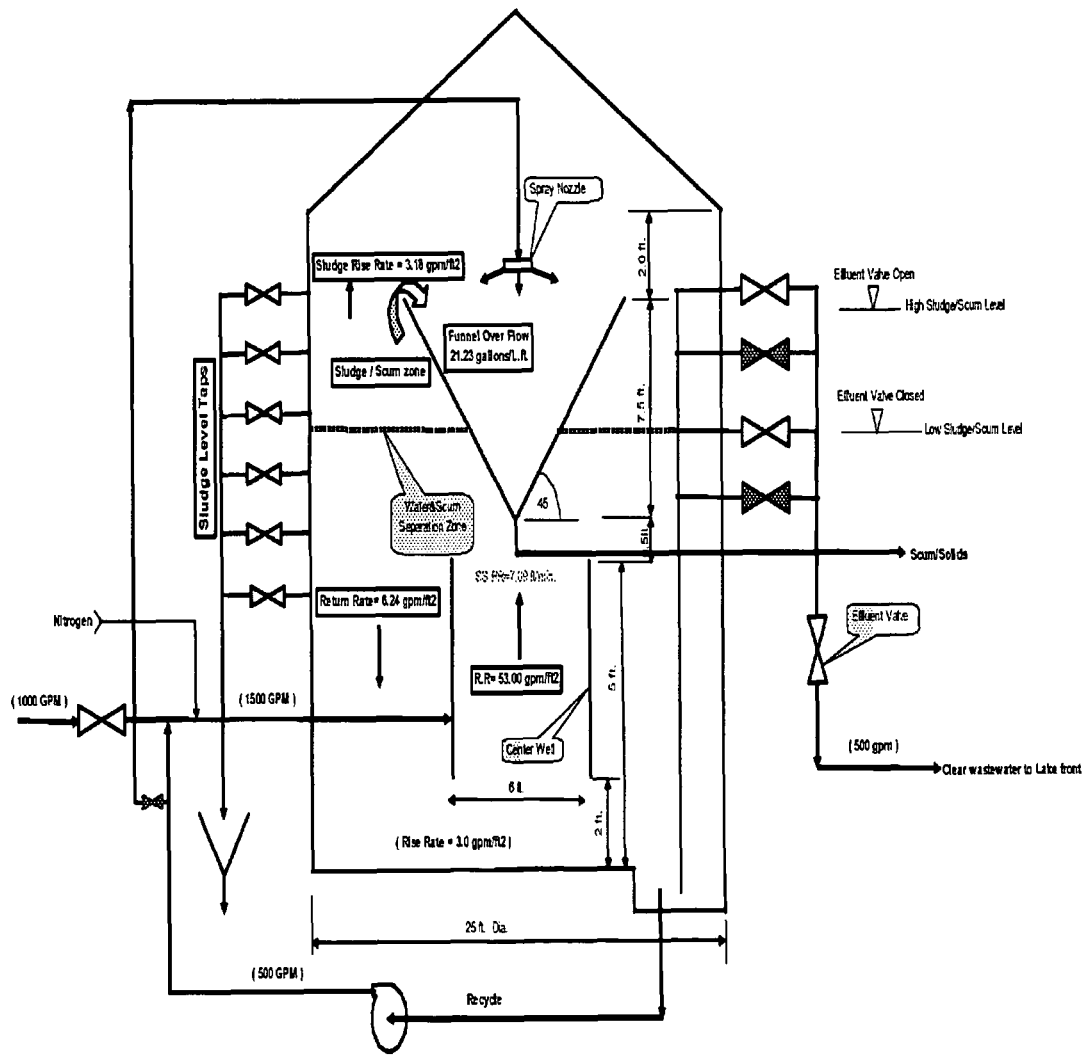

The inventor has discovered that mixed-phase feeds, and especially aqueous mixed-phase feeds can be effectively and inexpensively separated into a solid-depleted phase and a solid-enriched phase by inducing in the mixed-phase feed an enhanced up-flow to thereby form and/or stabilize a phase separation zone. As used herein, the term "solid-enriched phase" refers to a phase that has higher solid content than the phase from which the solid-enriched phase was produced. Similarly, the term "solid-depleted phase" as used herein refers to a phase that has lower solid content than the phase from which the solid-enriched phase was produced.

Most preferably, the enhanced up-flow is achieved by a flow-control structure that forces flow of the mixed-phase feed upwardly, and that is arranged such that at least some of the solid-depleted phase in the mixed feed is forced into a toroidal or otherwise closed-loop flow pattern. Such patterns may or may not be supported by the structure of the container or tank in which the control structure is at least partially disposed. As used herein, the term "toroidal" refers to an annular shape that is formed by revolving a circle, ellipsis, or otherwise rounded closed object around an axis external to the circle, ellipsis, or rounded object. To maintain the separation, it is still further preferred that at least some of the solid-depleted phase is removed from a lower portion of the container, and most preferably the bottom portion of the container, and that the floating solid-enriched phase (e.g., flocculated, aggregated, or otherwise agglomerated material, having a density lower than water and typically comprising at least some fluid) is removed by passing the solid phase over an overflow element (e.g., cone or funnel shape) that is preferably disposed within the container.

In still further particularly preferred aspects, it is contemplated that one portion of the solid-depleted phase that has been separated from the mixed-phase is withdrawn from the (preferably bottom of the) container and recycled back to the mixed-phase feed and/or flow control structure. Such recycling will advantageously increase the up-flow rate within the flow control structure and thus further enhance separation efficiency. Additionally, or alternatively, gas (e.g., ambient air, nitrogen, fuel gas, or oxygen) may be added to increase the up-flow and phase separation.

In further preferred aspects, another portion of the solid-depleted phase that has been separated from the mixed-phase is withdrawn from the system and disposed of and/or routed to other uses. For example, some of the solid-depleted phase that has been separated from the mixed-phase may also be used as a spray or rinse fluid to move solids located on an inner surface of the overflow element. It should be further recognized that contemplated devices and methods may be operated in a fully automated manner using a control system. Such system may employ various sensors to ascertain fluid/solid levels, flow rates, etc, and depending on the desired degree of separation may control feed rates and/or recycling rates.

FIG. 1 depicts an especially preferred exemplary skim tank 100 that comprises a generally cylindrical container 110 in which a flow-control structure 120, also preferably cylindrical, is disposed. As indicated by the arrows, the flow-control structure is configured to force flow of at least a portion of the solid-depleted phase of a mixed-phase feed into a toroidal motion around the flow control structure via upper opening 120A and lower opening 120B. A fluid conduit 130 is coupled to the container 110 at a preferably lower withdrawing section 112, wherein the conduit 130 is configured to allow recycling (via pump 132) of another portion of the solid-depleted phase back into the flow-control structure (here via combination with mixed-phase feed from mixed-phase feed source 180). Consequently, it should be noted that the up-flow volume delivered through conduit 124 is increased. Dashed line 116 indicates the separation zone below which the solid-depleted phase is predominantly found and above which the solid-enriched phase is predominantly found.

Overflow element 140 is typically arranged within the container above the flow-control structure 120 and configured to allow removal of a solid-enriched phase separated from the mixed-phase (here: via line 144). Most typically, gas source 150 may deliver gas (e.g., air, synthetic or isolated gas or gas mixture) to the mixed-phase feed, which is then delivered into the inner volume of the flow-control structure 120. Sludge level taps 172 are provided to allow control of and/or withdrawal of the solid-enriched and/or solid-depleted phase, and effluent valves 170 allow for withdrawal of at least some of the solid-depleted phase. Conduit 160 is further provided to deliver a fraction of the solid-depleted phase as a rinse fluid to an inner surface of the overflow element via spray or rinse nozzle 162. Alternatively, or additionally, further conduits 161 may be implemented to form a hydro skimmer that provide at least a portion of the solid-depleted phase to the tank to enhance solids (e.g., sludge) transfer to the overflow element 140.

Contemplated skim tanks will generally have a capacity of at least 100 liter, more typically at least 1000 liter, and most typically at least 5000 liter, and especially suitable tanks will be configured as cylindrical tank. However, in alternative aspects, various other tank shapes and volumes are also deemed suitable. It is further generally preferred that the skim tank will include at least one portion that has a sump or otherwise vertically recessed portion where the solid-depleted phase can be withdrawn. Such portion may be covered by a filter element, or may be located in a position distal to the toroidal movement of the feed. Further valves, sealable openings, or other entry/exit points may be included to allow withdrawal of unseparated feed, solid-depleted phase, and/or solid-enriched phase. In further contemplated aspects, the skim tank bottom can be sloped (or include angled elements)

to facilitate solids collection and/or removal. Most typically, contemplated skim tanks will also include one or more openings at or near the top (and above the solids-enriched phase) to allow venting or removal of volatile organic compounds to a suitable site.

With respect to suitable flow-control structures, it is generally preferred that the flow control structure is an open-ended cylindrical structure as shown in FIG. 1 and that the structure is centrally disposed within a cylindrical tank. Moreover, it is generally preferred that the lower opening of the structure will be in a position above the inner bottom surface of the tank to enable toroidal motion of the solid-depleted phase. Alternatively, the flow-control structure may also be coupled to the inner bottom of the tank and then include a plurality of openings to enable toroidal motion of the solid-depleted phase. Therefore, it should be appreciated that various structures are deemed suitable and should not be limited to use of a suspended cylindrical structure, and it should be appreciated that all structures are deemed suitable that allow a closed-loop movement (out of one portion of the structure and back into another portion of the structure) of at least some of the liquid introduced into the flow-control structure. For example, suitable structures include ellipsoid cylinders, square beam structures, and composite structures, all of which may have an uninterrupted surface or have one or more openings. In especially preferred aspects, the openings may be configured as flow-directing structures (e.g., to generate a vortex motion or turbulent flow within the flow-control structure), including jet structures, vane-type structures, etc. Additionally, one or more flow-directing elements may be provided to the flow-control structure (typically on at least the inner surface), for example, to impart centrifugal or other motion to the fluid/feed and/or to promote agglomeration of the solid phase. Such flow-directing elements will typically be configured as vanes or impellers.

It is generally preferred that the mixed-phase feed is directly and/or indirectly fed into the lumen of the flow-control structure. For example, direct feeding into the flow-control structure may be implemented by one or more feed pipes into the structure such that the feed will be released into a volume within the structure. Most typically, and especially where multiple feed pipes are used, the ends of the pipes will be at an upward angle to force up-flow of the feed into the structure. Indirect feeding may be implemented by using a diffuser, nozzle array, or other distributor device that directs the flow of the feed in an upwardly direction into the lumen of the flow-control structure. Regardless of the manner of feeding, it should be appreciated that the volume of material that is fed into the flow-control structure is larger than the volume that is to be separated as the feed is a product of the mixed-phase feed and the recycled portion of the solid-depleted phase. Consequently, a significantly larger up-flow is achieved which is further supported by the returning solid-depleted phase from the toroidal flow.

Where desired, gas may be introduced into the mixed feed. However, it should be noted that the gas may also be fed into the lumen on the flow-control structure using a sparger, nozzles, etc. Where the gas is separately fed to the flow-control structure, the feeding may be performed such that the gas imparts further upward momentum to the feed. Similarly, the recycling stream may be introduced via the mixed-phase feed or separately into the flow-control structure.

Preferred overflow elements will have a conical shape and be disposed above the flow-control structure with the upper edge acting as a weir across which the solid phase is moved as the solid phase develops higher and/or is moved up by the fluid level below the solid phase. However, in alternative aspects, the overflow element may have any other shape so long as the overflow element will preferentially receive the solid phase. For example, multiple overflow pipes (preferably vertically arranged) may be employed, or the upper edge of an open-ended container may act as the overflow element. Most preferably, the flow-control structure is configured to impart an up-flow motion into the mixed-phase feed and wherein the overflow element is configured to redirect the up-flow motion into a side-flow motion, which further assists the toroidal motion of the solid-depleted phase. Consequently, it should be appreciated that no moving parts are required in the skim tank and that such configuration significantly improves tank reliability, operation, and reduces costs and down-time.

In still further contemplated aspects, one or more control elements are provided and configured to allow raising of the liquid level in the tank such that at least some of the solid-enriched phase is forced into the overflow element. The control element(s) may be manually operated, or operated using level control sensors and a control circuit that is configured to determine or receive information on the level of fluid in the tank as well as the feed rate of mixed-phase feed into the tank. It should therefore be appreciated that contemplated systems and methods allow for an operation that requires no adjustments that are typically needed in heretofore known skim tanks (e.g., weir height and or solids accumulations), even in circumstances where the characteristics of skim tank feed (mixed-phase feed and/or recycled solid-depleted phase) changes. Moreover, it should be noted that the operating liquid level inside the skim tank can be adjusted from the outside of the tank (e.g., using control elements and/or taps) without effecting the skim tank operation to so allow for variable amounts of sludge accumulation.

Thus, specific embodiments and applications of skim tank configurations and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A skim tank, comprising:
   a container comprising a flow-control structure disposed within the container, wherein the flow-control structure is configured to force flow of a first portion of a solid-depleted phase of a mixed-phase feed into a toroidal motion within the container and around the flow control structure;
   wherein the container is configured to allow withdrawal of a second portion of the solid-depleted phase at a position below the flow control structure;
   a fluid conduit coupled to the container and configured to allow recycling of at least some of the second portion of the solid-depleted phase from a lower portion of the container back into the flow-control structure;
   an overflow element having conical shape and arranged in the container and configured to allow removal of a floating solid-enriched phase separated from the mixed-phase;

one or more control elements and a plurality of vertically spaced effluent valves that are configured to force at least some of the floating solid-enriched phase into the overflow element and to remove at least some of the solid-depleted phase from the container; and wherein the overflow element has a size and position relative to the flow-control structure to (a) redirect up-flow motion of the solid-depleted phase into a side-flow motion to thereby assist in formation of the toroidal motion, and (b) to present an upper edge into the solid-enriched phase to thereby act as a weir across which the solid phase is moved.

2. The skim tank of claim 1 further comprising a mixed-phase feed conduit that is configured to release the mixed-phase feed from the conduit into an inner volume of the flow-control structure at a position that is above a lower end of the flow-control structure.

3. The skim tank of claim 1 wherein the flow-control structure has an upper opening and a lower opening, and wherein the lower opening is suspended above an inner bottom surface of the container.

4. The skim tank of claim 1, wherein the flow-control structure has a cylindrical shape.

5. The skim tank of claim 3 wherein the flow-control structure has a cylindrical shape.

6. The skim tank of claim 1 further comprising a gas source coupled to the container and configured to provide gas to the mixed-phase feed.

7. The skim tank of claim 1 further comprising a second conduit configured to deliver a fraction of the solid-depleted phase as a rinse fluid to an inner surface of the overflow element.

8. The skim tank of claim 1 further comprising a control element that is configured to allow raising of a liquid level in the container such that at least some of the solid-enriched phase is forced into the overflow element.

9. The skim tank of claim 1 further comprising a feed conduit that is configured to fluidly couple the tank to a desalter mud wash unit such that the mixed-phase feed comprises an effluent from the desalter mud wash unit.

10. A method of separating a mixed-phase feed into a floating solid-enriched phase and a solid-depleted phase, comprising:

introducing the mixed-phase feed, optionally with a gas, into a container and using a flow control structure within the container to force a first portion of the solid-depleted phase into a toroidal motion around the flow control structure;

withdrawing a second portion of the solid-depleted phase back from the container at a position below the flow control structure and recycling the second portion of the solid-depleted phase back to the flow control structure;

using a conical overflow element positioned above the flow control structure to remove the floating solid phase that is separated from the mixed-phase feed;

using one or more control elements and a plurality of vertically spaced effluent valves to force at least some of the floating solid-enriched phase into the overflow element and to remove at least some of the solid-depleted phase from the container; and wherein the conical overflow element has a size and position relative to the flow control structure to (a) redirect up-flow motion of the solid-depleted phase into a side-flow motion to thereby assist in formation of the toroidal motion, and (b) to present an upper edge into the solid-enriched phase to thereby act as a weir across which the solid phase is moved.

11. The method of claim 10 wherein the flow control structure has a cylindrical shape and is centrally disposed within a tank.

12. The method of claim 10 wherein a mixed-phase feed conduit releases the mixed-phase feed from the mixed-phase feed conduit into an inner volume of the flow-control structure at a position that is above a lower end of the flow-control structure.

13. The method of claim 10 wherein the flow-control structure has an upper opening and a lower opening, and wherein the lower opening is suspended above an inner bottom surface of the container.

14. The method of claim 10 wherein the flow-control structure has a cylindrical shape.

15. The method of claim 10 wherein the mixed-phase feed is introduced with a gas.

16. The method of claim 10 wherein the mixed-phase feed comprises an effluent from a desalter mud wash operation.

* * * * *